United States Patent [19]

Albert

[11] 4,344,759

[45] Aug. 17, 1982

[54] METHOD AND APPARATUS FOR INDUCING PSYCHOLOGICAL RESPONSES

[76] Inventor: Stuart Albert, 1713 E. Florida Ave., Apt. 201, Urbana, Ill. 61801

[21] Appl. No.: 196,589

[22] Filed: Oct. 14, 1980

[51] Int. Cl.³ .............................................. G09B 1/14
[52] U.S. Cl. ...................................... 434/236; 434/430
[58] Field of Search ............... 434/236, 430, 433, 107, 434/108, 109, 237, 238, 332, 416, 258, 348, 349; 116/321, 322, 323, 324; 128/745

[56] References Cited

U.S. PATENT DOCUMENTS 2,293,887 8/1942 Chamberlain ................... 434/430 X
3,668,789 6/1972 Ferguson ........................... 434/332
4,063,369 12/1977 Hart .................................... 434/156

Primary Examiner—William H. Grieb
Attorney, Agent, or Firm—McDougall, Hersh & Scott

[57] ABSTRACT

An apparatus comprising symbols movable within a channel on a display board is used to elicit responses from a patient to the stress of separation. The symbols can be manipulated by the patient, a therapist or a researcher to aid in determining the nature of the separation experience. Stationary and movable panels are provided to selectively conceal the symbols from the view of the patient and thereby increase the number of symbol patterns which can be displayed.

4 Claims, 6 Drawing Figures

METHOD AND APPARATUS FOR INDUCING PSYCHOLOGICAL RESPONSES

BACKGROUND OF THE INVENTION

The present invention relates generally to an improved system for investigating the stress of separation and, particularly, to a method and apparatus for assessing the responses of an individual to separation so that the stress of separation may be better understood.

Separation is a difficult experience for many individuals. For example, the disappearance of a mother can make a child uncertain and anxious. The stress of separation can develop in the infant within ten to eighteen months after birth and is manifested throughout the life cycle, such as when an elderly person is required to move from one residence to another. Because separation occurs throughout the life cycle, a device which monitors the stress of separation must be of sufficient simplicity to be capable of use with any age group.

Devices have been in use for many years to test psychological responses. In many of the psychological tests currently in use, the individual is presented with a static display. A display having movable components, however, is a more effective stimulus in eliciting responses to separation than is a static display.

It is also advantageous to have a device which, in addition to being of sufficient simplicity for use with a person of any age, may be manipulated and controlled by either the individual, a therapist or a researcher. The advantage in allowing the person to manipulate the components of the device is that the person can engage actively in role playing and thereby develop a personal strategy for coping with the stress of separation.

Thus, the need exists for a system which assists a skilled observer in assessing the responses of an individual to stimuli which represent or symbolize interpersonal separations. The device and its method of operation must be uncomplicated, yet evoke reliable information. The present invention is directed to the fulfillment of these needs.

SUMMARY OF THE INVENTION

The invention is a method and apparatus by which a researcher or a therapist, such as a psychologist or psychiatrist, can elicit responses to interpersonal separations and determine the reaction of an individual to stressful situations.

The preferred embodiment of the invention comprises a display board having a channel in which displayed symbols can be moved. Stationary side panels are provided to permit the symbols to be totally or partially hidden from view upon movement of the symbols behind the panels. An additional panel or series of panels, movable within tracks on the board, may also be provided to cover the symbols and thereby hide them from view. Legs are provided to space the movable panels away from the surface of the board. The device is capable of being folded in half which has the advantage of reducing the size of the device for convenient transport and storage.

In the practice of the method of the invention, the symbols are moved within the channel on the display board by either the individual or the therapist. The response of the person to the symbols and their movement is observed and on that basis an interpretation of his understanding of interpersonal separation is proposed.

It is an object of this invention to provide a method and apparatus which cause an individual to respond to stimuli which symbolize or represent patterns associated with separation.

It is a further object of this invention to provide a skilled observer with reliable information so that the individual may be assisted in coping with the stress. The device has at least two functions-as a diagnostic and a therapeutic tool. In diagnosis, the device is used to assess the response of a patient to separation and to predict a subsequent adaptation to the stress of separation. In therapy, the device can be manipulated by the patient to facilitate role playing.

In addition, it is an object of this invention to provide a device which is capable of use by an individual of any age group.

Other objects and advantages of the invention will be apparent from the following detailed description made with reference to the accompanying drawings.

DETAILED DESCRIPTION OF THE INVENTION

Figures 1, 2, 3:
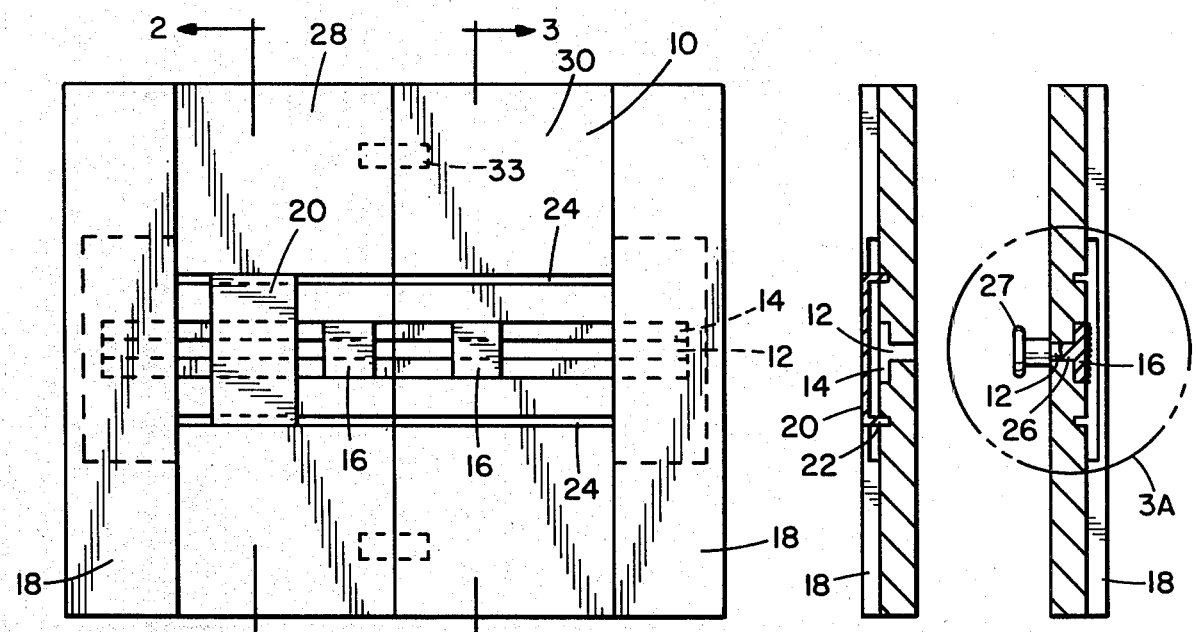
FIG. 1 is a front elevational view of a preferred embodiment of the invention.
FIG. 2 is a cross-sectional view taken along the line 2—2 of FIG. 1.
FIG. 3 is a cross-sectional view taken along the line 3—3 of FIG. 1.

Referring to FIG. 1, it will be seen that the device of the invention comprises a display board 10 having a channel 12 which extends transversely across and through the surface of the board. The board 10 is provided, preferably, with a pair of symbols 16 or other objects which can be displayed to a patient. A recess 14 is located parallel and adjacent to each side of the channel 12 so that the symbols can be positioned in the channel 12 and recesses 14 for movement along the board in a manner to be described.

Side panels 18, positioned perpendicular to the length of channel 12, may be provided to selectively permit the symbols to be concealed from view upon movement of the symbol to either end of the channel 12. A movable panel 20 provided with legs 22 may also be included to conceal the symbols from the view of the patient. Tracks 24, extending parallel to the channel, one on each side thereof, are provided in the board 10 to retain and guide legs 22 of the movable panel.

FIGS. 2 and 3 illustrate in greater detail the construction of the channel 12 and the movable panel 20. The panel 20 is supported in close proximity with the board 10 by legs 22; the panel 20 may be moved along the tracks 24 to cover any portion of the channel normally visible to view.

The purpose of the symbols 16 is to represent persons, other objects or events involved in separation. The symbols may take the form of a series of geometric shapes, stick figures or caricatures. Children may be presented with a display of cartoon characters to increase their familiarity with the displayed symbols. For that purpose, the surface of the symbols may be provided with "Velcro" to temporarily attach the various figures thereto.

Another display which readily elicits responses from a patient involves the display of photographs. If, for example, two symbols are displayed, one symbol may be a photograph of the patient, while the other symbol is a photograph of a familiar person, place or thing. In short, the number of useful combinations which can be presented is infinite.

Figures 3A, 4:
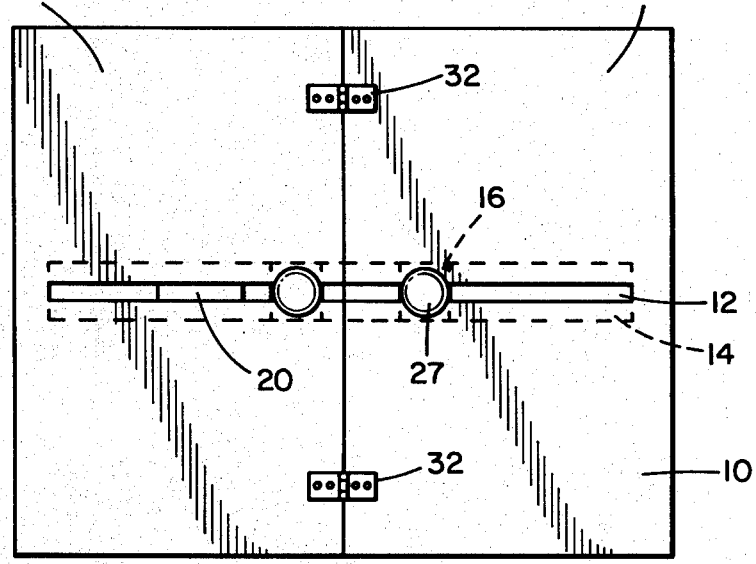
FIG. 3A is an enlargement of a portion of FIG. 3.
FIG. 4 is a rear elevational view of the device.

As illustrated in FIGS. 3 and 3A, the symbols 16 are held within the channel 12 by a supporting means 26, such as a length of dowel rod or a bar. The supporting means 26 is connected to the symbol 16 by a suitable adhesive or may be formed integrally therewith. Support means 26 extends through the channel to the rear of the board; it terminates in a member 27 which extends beyond the board and is shaped to facilitate manipulation of the symbols from the rear of the board. In this manner, the symbols 16 are capable of being moved within the channel 12 and recesses 14 across the width of the board.

Figure 5:
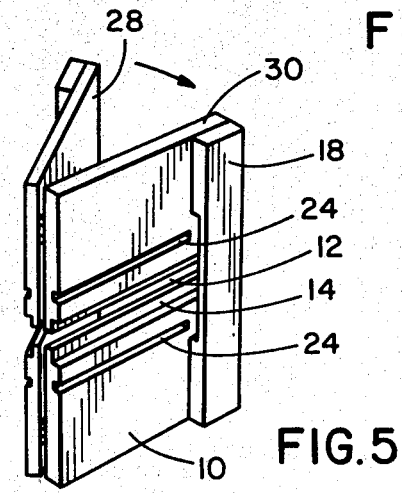
FIG. 5 is a perspective view of the device in a partially folded position.

FIG. 4 illustrates a rear view of the device. The device may comprise two equivalent sections 28 and 30 which are joined by a pair of hinges 32 so that the device can be folded for convenient storage and transport (see FIG. 5).

Note that the channel 12 and recesses 14 extend across the entire length of both halves 28 and 30 of the board 10. In this manner it is possible to move a symbol under a side panel 18 so that the symbol is totally or partially hidden from view.

In addition, it will be noted that the movable panel 20 can also serve to conceal a symbol or a group of symbols from the view of the individual. The concealment of a symbol is an important aspect of the present invention. This feature enhances the utility of the invention since a wider variety of symbol patterns may be displayed.

In the practice of the method of the invention, the symbols are moved in the channel 12 of the display board 10 by either the patient or a therapist and the response to these movements is observed. There are two modes in which the device is used. In the first mode the device is used as a stimulus to present a variety of patterns of separation. In the second mode the device is manipulated by the individual to display various patterns of separation. It is quite possible to use both modes with the same person. For example, a therapist might begin by presenting a pattern of separation along with a story; then stop and ask the person to supply an ending to the story.

Fundamental to the method is the concept that a variety of symbol patterns and the manner of their display on the board can provide multiple stimuli to the individual. Among the variables that one can change to produce different kinds of patterns are the following:

A. The speed of departure of one symbol from another may be increased or decreased.

B. Both symbols or only one can be moved apart. In addition, both symbols or only one can be returned.

C. The symbols can be returned after a long or short period of time.

D. The symbols can be defined for the patient as friends, lovers, strangers, parents, children, etc.. Alternatively, the symbols can be left undefined and presented to the patient as simple geometric shapes. Thereafter, the patient is asked who the symbols represent.

E. More complicated patterns are possible. For example, an oscillating pattern of approach and departure may be displayed. Such a pattern may indicate ambivalence. In the presentation of an oscillating pattern, the therapist could vary the number of cycles, the amplitude of each cycle, and the duration of pauses or hesitations.

F. Another possible pattern is a type of "push and bump" display in which the symbols strike each other in a variety of ways.

G. It is clear that patterns can be combined in different ways so that one might have a combination of speeds, symbols, and symbol definitions to produce a rather complex past history of separation.

H. The symbols need not completely leave the visual field of the observer. For example, one symbol can remain partially hidden from view.

I. There can also be patterns in which not all the symbols are simultaneously presented to the individual. For example, two symbols may separate from each other. One symbol may remain in the center of the board. After a delay, a third symbol approaches. The person is then asked to construct a dialog between the new symbol and the one that remains.

While the past description has emphasized the use of the device in understanding interpersonal separation, the movable symbols and the patterns represented can also reflect the beginning of interpersonal encounters. Therefore, the device can be used to aid in understanding the thoughts and feelings of an individual in beginning conversations, friendships or the like.

It will be understood that various changes and modifications may be made in the above-described method and apparatus without departing from the spirit thereof, particularly as defined in the following claims.

What is claimed is:

1. An apparatus for eliciting psychological responses from human beings, said apparatus comprising:
   (a) a board having a channel extending transversely across the surface thereof;
   (b) at least two symbols movably positioned in said channel;
   (c) means for supporting and moving said symbols within said channel;
   (d) at least one stationary panel secured to said board and spaced therefrom, said stationary panel covering a section of said channel to permit a symbol to be positioned therebehind to remove the symbol from view;
   (e) a pair of tracks extending transversely across the surface of said board parallel to said channel, one track disposed on either side of said channel; and
   (f) at least one movable panel secured to and movable within said tracks whereby selected portions of said channel can be blocked from view and the symbols movable within said channel can be positioned therebehind.

2. An apparatus in accordance with claim 1 wherein said supporting and moving means comprises a member which extends through said channel to the rear of said board and includes a portion adapted to be manipulated to control the movement of said symbols.

3. The apparatus in accordance with claim 1 wherein said board is formed in two sections hingedly secured together, whereby the sections may be folded to form a compact unit for storage or travel.

4. The apparatus in accordance with claim 1 wherein said symbols include means for attaching figures or photographs thereto whereby the symbols may be more readily accepted by the human as representative of a selected person, place or thing.

* * * * *